| -continued | |
|---|---|
| Aromatics in Vol %; min. | 95 |
| boiling point range °C. | 143–171 |
| Composition | % |
| non-aromatics | 4.40 |
| ethylbenzene | 0.26 |
| 1,2-xylene | 32.29 |
| 1,3-xylene | 1.25 |
| 1,4-xylene | 0.75 |
| 1,3-methyl-ethylbenzene | 5.05 |
| 1,3-methyl-ethylbenzene | 4.93 |
| 1,4-methyl-ethylbenzene | 17.75 |
| 1,2,3-trimethylbenzene | 3.62 |
| 1,2,4-trimethylbenzene | 22.45 |
| 1,3,5-trimethylbenzene | 6.50 |
| $C_{10}$ aromatics, and heavier | 0.75 |
| | 100.00 |

$N_3$ = highly aromatic solvent, similar to $N_1$ and $N_2$, hereinabove.

Surfactants f and g above are mixtures of mono- and diesters of orthophosphoric acid represented by the following structures:

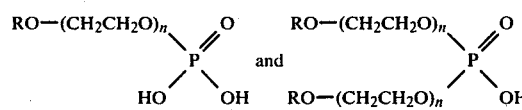

wherein R is $C_8$–$C_{20}$ alkyl or alkylphenyl and n is the number of moles of ethylene oxide condensed with hydrophobe R-OH, and represents an integer of 6 to 10.

TABLE Ia

Components and rated properties of emulsion concentrate compositions of the present invention

| | | | Percent by Weight Composition | | | | | | Properties * | | |
|---|---|---|---|---|---|---|---|---|---|---|---|
| No | Toxicant* | Phenol | Surfactant A; | amount | Surfactant B; | amount | Solvent; | amount | B | E | C |
| 1 | 62.9 | 15.0 | c | 7.0 | | | MCB; | 15.1 | S | S | U |
| 2 | 62.4 | 22.4 | c | 7.0 | | | MCB; | 8.2 | U | S | S |
| 3 | 62.4 | 20.4 | c | 7.0 | | | MCB; 8.2; and $N_3$ | 2.0 | U | S | S |
| 4 | 66.0 | 23.0 | c | 5.0 | | | m. ol. | 6.0 | S | S | U |
| 5 | 66.0 | 23.0 | c | 5.0 | | | $N_2$ | 6.0 | U | S | S |
| 6 | 62.4 | 23.4 | e | 5.0 | | | MCB; | 9.2 | U | S | S |
| 7 | 62.4 | 20.4 | e | 7.0 | | | MCB; 8.2; and $N_3$ | 2.0 | U | S | S |
| 8 | 65.0 | 19.0 | e | 7.0 | | | MCB; | 9.0 | U | S | S |
| 9 | 62.4 | 23.4 | j | 5.0 | | | MCB; | 9.2 | S | S | U |
| 10 | 65.0 | 19.0 | j | 7.0 | | | $N_2$; 4.6; and 3 NOX; | 4.4 | S | S | U |
| 11 | 65.3 | 17.0 | j | 7.0 | | | $N_2$; 6.0; and n. phen | 4.6 | S | S | U |
| 12 | 62.4 | 23.4 | a | 3.5 | b | 1.5 | MCB; | 9.2 | U | S | S |
| 13 | 65.2 | 23.0 | a | 3.5 | b | 1.5 | m. ol. | 6.8 | S | S | U |
| 14 | 60.0 | 20.0 | i | 3.5 | h | 1.5 | Xylene | 15.0 | U | S | S |

* No. 1–8 inclusive 97% pure; 9–14 inclusive 93% pure

Property Rating System
Properties
B(Bloom): S(atisfactory) if B is greater than 10%
E(Emulsion): S(atisfactory) if emulsion forms on agitation
C(crystallization): S(atisfactory) if sample stored at 25° F. shows no trace of crystallization: otherwise: U(nsatisfactory)

TABLE Ib

Components and rated properties of emulsion concentrate compositions of the present invention

| | | | Percent by Weight Composition | | | | | | Properties ** | | |
|---|---|---|---|---|---|---|---|---|---|---|---|
| No | Toxicant* | Phenol | Surfactant A; | amount | Surfactant B; | amount | Solvent; | amount | B | E | C |
| 15 | 64.5 | 23.2 | e | 4.7 | f | 4.7 | $N_2$ | 2.9 | — | — | 0 |
| 16 | 66.0 | 22.3 | e | 4.4 | f | 5.2 | $N_2$ | 2.9 | + | 0 | 0 |
| 17 | 66.0 | 22.5 | c | 5.2 | f | 5.2 | $N_2$ | 3.0 | + | 0 | 0 |
| 18 | 66.0 | 25.2 | c | 2.9 | f | 2.9 | $N_2$ | 2.9 | 0 | — | + |
| 19 | 66.0 | 26.4 | d | 4.6 | f | 1.1 | $N_2$ | 1.9 | — | — | + |
| 20 | 66.0 | 25.7 | d | 5.0 | f | 1.2 | $N_2$ | 2.1 | — — | — | + |
| 21 | 66.0 | 25.0 | d | 4.8 | f | 1.2 | $N_2$ | 3.0 | — — | — | + |
| 22 | 66.0 | 22.8 | d | 6.2 | f | 1.5 | $N_2$ | 3.5 | — | + | 0 |
| 23 | 66.0 | 24.5 | d | 5.9 | f | 1.5 | $N_2$ | 2.1 | — — | + | + |
| 24 | 66.0 | 23.0 | d | 6.4 | f | 1.6 | $N_2$ | 3.0 | — | ++ | 0 |
| 25 | 66.0 | 23.5 | d | 6.2 | f | 1.6 | $N_2$ | 2.7 | — | ++ | 0 |
| 26 | 66.0 | 22.5 | d | 6.4 | f | 1.6 | $N_2$ | 3.5 | — | + | 0 |
| 27 | 66.0 | 23.5 | d | 6.2 | f | 1.6 | $N_2$ | 2.7 | — | — | 0 |
| 28 | 66.0 | 20.7 | d | 7.4 | f | 1.8 | $N_2$ | 4.1 | + | ++ | — |
| 29 | 66.0 | 21.7 | d | 7.0 | f | 1.8 | $N_2$ | 3.5 | + | ++ | — |
| 30 | 66.0 | 22.3 | d | 6.6 | f | 2.2 | $N_2$ | 2.9 | + | + | 0 |

*93% pure

Property Rating System

| ** Properties | ++ | + | 0 | — | — — |
|---|---|---|---|---|---|
| B(Bloom) | >80% | 60–80% | 30–60% | 10–30% | <10% |
| E(Emulsion) | No cream | ≦1 ml | 1–2 ml | 2–4 ml | 4–5 ml |
| C(Crystallization) | 20° F./No | 20° F./Yes | 25° F./Yes | 30° F./Yes | 30° F./Yes |
| | | 25° F./No | 30° F./No | Reversible, 12 hrs. at room temp. | Not Reversible, 12 hrs. at room temperature |

CONTAMINATED
METALLIC
SCRAP

EXHAUST
GAS

METALLIC SCRAP DECONTAMINATION PROCESS

CROSS-REFERENCE TO RELATED APPLICATIONS

This application is a continuation-in-part of my application Ser. No. 771,846 filed Feb. 25, 1977 now U.S. Pat. No. 4,264,060 entitled "METHOD AND APPARATUS FOR TREATING METALLIC SCRAP IN THE RECOVERY OF METAL THEREFROM", the complete disclosure of which is herein incorporated by reference.

BACKGROUND OF THE INVENTION

This application discloses a process whereby metallic scrap can be decontaminated in a container by concurrently passing in the same direction both the scrap and a hot gas through the container transferring heat from the hot gas to the scrap.

In my application Ser. No. 771,846 now U.S. Pat. No. 4,264,060 I described some of the known art methods for decontaminating scrap. Briefly, these can be broken down as follows. Certain processes decontaminate scrap by passing the scrap through a rotary kiln which also contains within the interior of the kiln a burner which heats the interior of the kiln. Utilizing this type of process, the scrap within the kiln is subjected to direct impingement of the flame on the surface of the scrap. This is considered disadvantageous because those portions of the scrap which are subjected to the flame are heated beyond that point necessary to burn the scrap and in fact are heated to a point where oxidation or melting of the metallic scrap itself takes place.

In a different type of decontamination process the scrap is placed in either trays or in piles within a furnace. The scrap is heated indirectly by heating either the walls of the furnace or the gases within the interior of the furnace. This method has the advantage over the previously described method in that the surface of the scrap is not directly impinged upon by the flame; however, since the scrap is either located in a container or in a pile the scrap within the interior of the container or a pile in effect can only be heated by heat conducted by the scrap surrounding it. In order to heat the scrap within the interior of the pile sufficient to decontaminate it, the scrap on the exterior of the pile is heated to a point above that necessary to decontaminate it which results in surface oxidation. This process in effect is analogous to baking a roast in an oven. Before the middle is done, the outside is browned.

In a third process the scrap is passed through a rotating kiln and a hot gas is passed countercurrent to the scrap. A representative example of this process is that described in U.S. Pat. No. 4,010,935. In this process the scrap exiting the kiln is at its highest temperature and it is at this point that it is exposed to the maximum temperature gas. At the inlet end of the kiln the scrap is relatively cool such as at ambient temperature, and the gas exiting the inlet end of the kiln is cooler than the gas passed into the kiln at the scrap exit end of the kiln because it has lost heat to the scrap. To decontaminate the scrap the scrap must be raised to a temperature causing decomposition of the contaminants. Further, it must be held there for a time sufficient to ensure complete decomposition. Since the scrap exiting the kiln contacts the hottest temperature gas just prior to exiting the kiln either one or the other of the following takes place. If the scrap is only raised to the oxidation temperature at the moment it exits the kiln, it will not be held at this temperature for a period long enough to ensure complete oxidation of the contaminants. If the scrap obtains the proper oxidation temperature some time prior to when it exits the kiln, than if it remains in the kiln for a time period sufficient to ensure complete oxidation, because it will be further contacted with high temperature hot gas before it is discharged from the exit end of the kiln, it will be heated to a temperature greater than the optimum decontamination oxidation temperature and will be exposed to temperature which can cause metal oxidation.

Most of man's most useful metals are found on the earth in the form of ores. To convert these ores to the free metals energy must be expended. It is also possible to collect used metals such as scrap and recycle them or re-refine them into new starting stock for man's consumer products. With certain metals, aluminum being a representative example, conversion from the ore to the pure metal requires a greater energy expenditure than conversion of reprocessed or scrap metals back into basic feed stocks. In view of the necessity for energy conservation the reprocessing of scrap and used metals has become of paramount importance.

BRIEF SUMMARY OF THE INVENTION

In view of the importance of reprocessing metallic scrap and in view of the deficiencies of the prior art processes known for doing the same it is considered there exists a need for improved processes for recovering this scrap. In view of this need it is a broad object to provide such a process. This broad object includes providing a process which is capable of handling scrap of varying sizes and thicknesses, scrap contaminated with a variety of different contaminants and including scrap contaminated with both inorganic and organic contaminants such as paint pigments and oils. It is an additional object to provide a process in which the scrap is not subjected to direct impingement of flame or abnormally long exposure to eccessively hot gases.

These objects and additional objects which will be apparent in the remainder of this specification are achieved by providing a process of decontaminating contaminated metallic scrap which includes moving the scrap through a container from the inlet end of the container to the exit end of the container and concurrently moving an oxygen bearing hot gas through the container in the same direction as the scrap. While in the container the scrap is mixed and agitated which serves to (a) expose the scrap to the hot gas and (b) additionally cause the scrap to impinge upon itself flaking off contaminants adhering to the surface of the scrap. Small particle contaminants and/or fines within the scrap are pneumatically conveyed from the surface of the scrap by the hot gas stream. The hot gas stream transfers heat to the scrap while concurrently decreasing in temperature. This heats the scrap through a first temperature phase wherein low boiling or temperature sensitive decontaminants are volatilized and/or decomposed and the scrap is further heated to a second temperature phase wherein high boiling contaminants are decomposed and the oxygen in the hot gas stream oxidizes the remaining oxidizable contaminants still adhering to the scrap. The scrap is maintained in the second temperature phase for a time period sufficient to insure complete oxidation of any oxidizable contaminant and then the scrap is discharged from the container.

BRIEF DESCRIPTION OF THE DRAWING

This invention will be better understood when taken in conjunction with the drawing wherein:

FIG. 1 shows a diagrammatic representation of the process of the invention; and

FIG. 2 is a diagrammatic representation of the temperature phases of the invention.

The invention described in this specification and the drawing utilizes and employs certain operative concepts and principles. These concepts and principles are set forth and defined in the appended claims forming a part of this specification. Those skilled in the art to which this invention pertains will realize that these concepts and principles could be applied to a number of differently appearing embodiments. For this reason the invention is not to be construed in light of only the embodiments described but is to be construed in light of the appended claims.

DETAILED DESCRIPTION

The process of the instant invention is carried out in a container 10 having an inlet end 12 and an exit end 14. As shown in FIG. 1, at the inlet end 12 of container 10 contaminated metallic scrap not shown or numbered is injected into the container 10 along with an oxygen bearing hot gas. The scrap is moved from the inlet end 12 to the exit end 14 parallel within a hot gas flow and during this movement the scrap is also moved within the interior space of the container such that it is continually mixed and agitated. This mixing and agitating exposes the scrap to the hot gas moving through the interior of the container and further, causes the pieces of the scrap to impinge or strike and scrape against one another. After the process is complete the scrap is discharged from the exit end of the container and the exhaust gas is also discharged. When the scrap is discharged at the exit end 14 it has been heated to a temperature sufficient to effect decontamination but has not been overheated to the point wherein significant oxidation or melting of the scrap itself has taken place. The exhaust gas exiting from the container 10 has been reduced in temperature to the point wherein the exhaust gas and the decontaminated scrap are at or near the same temperature.

The instant process is used to decontaminate metallic scrap which is contaminated with a wide variety of different types of contaminants. This wide variety of contaminants would include cuttings or tailings produced during the machining or milling of parts and as such, this type of scrap would chiefly be contaminated with oils and other lubricants used during these machining or milling processes. Another source of contaminate scrap for the instant process would be scrap aluminum such as aluminum cans and other aluminum containers used for the storage and transporting of liquids and foods. This type of scrap will mainly be contaminated with paints, lacquers and organic litter. Depending upon the prior processing of this type of scrap the scrap might also contain large amounts of dirt and other small particles. Metallic scrap that is mainly of a ferrous nature can also be contaminated with oxides. The instant process includes physical abrasive contact between the scrap pieces which helps decontaminate this type of contaminant.

When the scrap is loaded in the container 10 at the inlet end 12 it is subjected to forces causing three movements within the container 10. The first movement is a general movement of the scrap from the inlet end 12 to the exit end 14 of the container 10. This movement can be achieved by the container 10 being set at an oblique angle or otherwise sloped causing the scrap to generally descend from the elevated inlet end 12 to the depressed exit end 14. Further, the container 10 can be fitted with internal lifters or other devices which generally urge the scrap within the container 10 from the inlet end 12 to the exit end 14.

The second movement of the scrap within the container 10 is movement within the container transverse to the longitudinal movement of the scrap through the container 10. This transverse movement within the container results in mixing and agitating of the scrap in localized areas in the container 10. The mixing and agitating generally serve two distinct purposes. The first is the scrap is continuously exposed to the hot gas moving along parallel with the scrap through the container 10. This contact with the hot gas causes transfer of heat from the hot gas to the scrap as hereinafter described. Secondly, the mixing and agitation of the scrap causes the scrap to impinge on itself. This impingement results in the scrap acting as an abrasion agent on itself. This abrading action breaks loose both large and small pieces of adhering contaminants such as paint flakes and/or rust spots. It further serves as a temperature modulator or normalizer in that the scrap bed is continually being agitated and the hotter pieces are continually being re-oriented in respect to the cold pieces so that there is an effective heat transfer from the hotter pieces of scrap to the colder pieces of scrap.

The third movement within the container 10 is a pneumatic movement of small particles by the gas stream within the container 10. This pneumatic movement is expressed as both movement of small particles of contaminants and/or fines contaminating the scrap as well as affecting a movement of the smaller pieces of scrap at an accelerated rate compared to larger pieces of scrap. Depending on the scrap and the contaminant on the scrap, there will be a varying degree of small particle contaminants in the scrap. If the scrap contains a large amount of dirt and other contaminants adhering to its surface, these contaminants which are generally 100% inorganic and thus not subject to low temperature decomposition are conveyed out of the container by the moving gas stream as they are continuously exposed to the gas stream by the transverse movement of the scrap within the container 10. Depending upon the scrap being decontaminated and its ultimate use this removal of small size inorganic particles, i.e., approximately 100 micron or less in size, can result in less dross or slag being produced when the scrap, exiting the container 10, is melted in a melter.

The pneumatic action of the hot gas on the smaller pieces of scrap helps achieve the temperature control of the instant process in that the smaller pieces of scrap have a high surface area compared to larger pieces of scrap and thus tend to heat up more rapidly. Because these smaller rapidly heated pieces of scrap are pneumatically conveyed within the container 10, in addition to the movements previously described they tend to progress from the inlet end 12 to the exit end 14 at a faster rate than the bulkier pieces which are not pneumatically conveyed. This results in less overall exposure to these smaller pieces to the hot gas flowing through the container 10 which ultimately results in limiting the oxidation on the surface of these small pieces of scrap. Further, as hereinafter explained in greater detail part of the heating process within the container 10 results in oxidation of certain of the components of the contaminants. After these contaminants are oxidized they generally are converted into carbon dioxide-carbon monoxide which are removed by the pneumatic conveying effect of the hot gas. A portion of the remaining inorganic particles are removed from the surface of the scrap as described above by the impinging abrasion processes which free them from the surface of the scrap.

The instant process typically will entail decontamination of pieces of scrap ranging from about ⅜ inch thickness to about 0.004 inches in thickness. The larger pieces of scrap typically might range between about 12 inches by 12 inches square or ⅜ inch cubes and the smaller pieces typically will be small shavings or other tailings produced in processes such as milling or crushing of recycled cans. The larger pieces of scrap typically will remain inside the container 10 for a longer period of time than the smaller pieces. Normally residence time for the scrap will be from about three minutes to about 20 minutes within the interior of the container 10. For more homogeneous mixtures of scrap typical residence time will be from about five minutes to about 15 minutes. These residence times within the container 10 are dependent upon a variety of factors . . . including scrap size as discussed—the overall density of the bulk of scrap within the container 10, i.e., the rate of scrap fed into and out of the container 10, and the inlet temperature of the hot gas. Additionally, the metallic nature of the scrap will also affect residence time; that is, aluminum scrap will have one set of parameters governing the extremes of its residence time within the container 10 and other metals will each have their own set of parameters.

FIG. 2 shows a diagrammatic representation of the temperature of both the scrap and the hot gas within the interior of the container 10. By use of the instant process the temperature of the scrap exiting the outlet end 14 of the container 10 can be controlled such that its exit temperature falls within a very narrow range of temperature variation. The instant process subjects the scrap to a particular heating cycle which allows for decontamination of the scrap, yet does not subject the scrap to such excessive temperature which will significantly oxidize and/or melt the scrap.

Overall, the scrap is first placed at the inlet end 12 of the container 10 normally when it is at or about ambient temperature. The hot gas entering the inlet end 12 of the container 10 is generally from about 1100° to about 2000° F., preferably from about 1250° to 1600° F. Proximal to the inlet end 12 of container 10 the scrap is rapidly raised through a first temperature phase generally occurring when the scrap is between 200° and 750° F. During this first temperature phase any water or other liquids adhering to the surface of the scrap are vaporized into steam or the appropriate gas obtainable from such other liquids. Concurrent with this, easily volatilized or low decomposing contaminants are also volatilized and/or decomposed into volatile gases. Cracking of large molecules can occur during this process to produce secondary volatile products. The gases produced by the volatilization or decomposition of the contaminants are disbursed into the hot gas stream flowing around the scrap. The mixing and agitating as previously discussed helps to insure rapid dilution and/or disbursement of the volatilized or decomposed products thus produced in the gas stream.

After passing through the first temperature phase the hot gas continues to transfer heat to the scrap further lowering the temperature of the hot gas and raising the temperature of the scrap. The scrap is heated from the temperature of the first phase through an intermediate phase until it reaches about 850° F. at which time it enters the second phase. Normally all vaporization and non-oxidative decomposition have been effected by the time the scrap has reached 750° F. As the scrap passes through the intermediate phase which is generally between 750° to 850° F., it continues to absorb heat. During both the first phase and the intermediate phase the transfer of heat from the hot gas to the scrap is very rapid. This results in the hot gas and the scrap both rapidly approaching an equilibrium temperature.

When the scrap is about 850° to 900° F. it enters the second temperature phase and oxidation of the non-volatile or non-decomposable components of the contaminants is normally the dominant reaction. This oxidation is further controlled by the composition of the hot gas stream as hereinafter described. Generally, the scrap will be contaminated with contaminants which will be completely oxidizable below about 1200° F. While it is considered that during the second temperature phase oxidation is the predominating reaction, depending on the contaminants on the scrap, in addition to the oxidation reaction, volatilization and other non-oxidative gasification of the high boiling resins, tars, pitches and other similar contaminants, can also take place during the second temperature phase. If this type of high boiling or thermally stable contaminant is volatilized or decomposed into a flammable gas during the second temperature phase, the gas thus generated will be removed in the same manner as similar gases generated during the first temperature phase.

Depending upon the exact contaminant which is being removed from the scrap, the scrap will be raised to a final temperature of from about 850° F. to about 1200° F. in the second temperature phase. Preferably this second temperature phase will fall in the range of from about 900° F. to about 1050° F. Once the temperature of the scrap has reached the appropriate second temperature phase the scrap is held at this temperature for a time sufficient to achieve complete removal of the contaminants which are subject to thermal decomposition and/or oxidation. The inlet temperature of the hot gas is chosen from the range previously described such that during the second temperature phase both the scrap and the hot gas approach about the same temperature. This allows for continuous exposure of the scrap to the hot gas to hold the scrap at the final decontamination temperature without subjecting the scrap to higher gas temperatures which would further heat the scrap beyond the desired second temperature phase final temperature. Normally the time to insure complete decontamination of the scrap will be from about two to about 18 minutes. Thus, of the total residence time noted above the majority of this time is spent with the scrap held at its fixed final temperature to insure complete decontamination, said fixed final temperature being sufficiently low to insure that neither excess oxidation of the metal itself nor melting of the metal occurs.

During its residence time in the container 10 the scrap is heated by a combination of radiation, convection, conduction from the gas flow and absorption of a portion of the heat generated in the exothermic reactions associated with cracking and/or oxidation of the hydrocarbon contaminants. Because of the mixing and agitation going on within the interior of the container 10 heat is transferred not only from the hot gas directly to the scrap but from the hotter pieces of the scrap to the colder pieces of the scrap. By use of the process of the instant invention, the total body of a heterogeneous scrap composed of an assortment of sizes is raised to a uniform temperature, a temperature sufficient to cause decontamination of the scrap without overheating the scrap.

The heating of the scrap within the container 10 is an essentially flameless heating. This flameless heating is achieved by a combination of dilution of flammable volatiles within the hot gas stream, selection of temperature of the hot gas stream and control of the oxygen content of the hot gas stream.

In order to inhibit flaming, the oxygen content of the hot gas stream entering the container 10 at the inlet 12 is maintained between a minimum of 2% and a maximum of 8%. In order to insure complete oxidation of the oxidizable contaminants, some oxygen must be present. However, if too great an oxygen level is present in the first temperature phase of the process when the majority of the normal flammable contaminants are being volatilized, this high oxygen content will promote and/or perpetuate flaming of these volatiles within the container. The process, therefore, supplies oxygen sufficient to insure complete oxidation in the second temperature phase but not an oxygen content high enough to support general flaming within the container 10. The oxygen content of the hot gas is also related to the temperature of the hot gas. If the temperature of the hot gas stream introduced into the inlet end 12 is about or is greater than 1500° F. the maximum oxygen content in order to stay within the non-flaming limit is about 4% to 6%. If the temperature of the hot gas being introduced at the inlet end 12 of the container 10 is less than 1500° F. the oxygen content can be raised to about 6% to 8%.

As the volatile components are volatilized or decomposed in the first temperature phase they are transferred from the surface of the scrap to the gaseous atmosphere inside the container 10. The flow rate of the hot gas through the container 10 is adjusted such that these volatile components are diluted out into the hot gas stream such that in combination with the above described oxygen limits they are below the concentration limit wherein flaming can be supported. Some very localized flaming may occur right on the surface of some scrap; however, this flaming cannot be perpetuated because the products that support this flaming are rapidly diluted below their flammability limit in the controlled atmosphere within the container 10 having the oxygen limits as described and the temperature limits as described.

Normally the hot gas will flow through the container 10 from the inlet end 12 to the exit end 14 at a velocity of from about 7 to about 12 feet per second. Mass flow associated with this velocity will result in limiting the concentration of the flammable hydrocarbons per unit amount of gas flowing through the container. Generally this concentration will be below the 25% flammability limit as established by existing fire code guidelines. For furnaces with appropriate safety monitoring devices, this can be extended to a 50% limit. This limit can be expressed as the amount of Btu's of heat value of the flammable gas produced per pound of hot gas in the container 10. Depending of course upon the particular hydrocarbon contaminant from which the flammable gas was derived, typically for the 25% limit the range will be from about 150 Btu's per pound to about 180 Btu's per pound with an average value of about 160 Btu's per pound.

The hot gas which is used in the process can be generated specifically within the temperature and oxygen content level herein described, but preferredly the hot gas will be gas produced as described in my above noted U.S. application Ser. No. 771,846. For use in assisting in mixing and agitating, the container 10 can be equipped with internal lifters or other equivalent mechanical components and the container 10 rotated to effect the mixing and agitation.

The flow rate of the scrap through the container 10 will be governed by the size and shape of its pieces in conjunction with the percentage of and the type of contaminants contaminating the scrap. Typically, scrap composed mainly of cans will have contaminants in the order of approximately one to three percent by weight while mill turnings will have contaminants in the order of about five to fifteen percent by weight. Since the mill scrap would produce more volatiles and flammable gases, its flow rate through the container 10 would be correspondingly slower than an equal weight of can scrap and/or the flow rate of the hot gases for the mill turnings would be greater.

In order to insure maintaining the proper gaseous environment within the interior of the container 10 in respect to both temperature and oxygen content of the gaseous environment, the container 10 will generally be sealed to the ingress of ambient gases into its interior.

I claim:
1. A process for decontamination of contaminated metallic scrap which comprises:
   passing an oxygen bearing hot gas through the interior of a container having an inlet end and an exit end, said hot gas entering said container at said inlet end and exiting said container at said exit end;
   locating said contaminated scrap within the interior of said container at said inlet end;
   concurrently
   (a) moving said scrap from said inlet to said exit end of said container, (b) mixing and agitating said scrap within the interior of said container, and (c) contacting said scrap with said hot gas stream under conditions essentially incapable of sustaining flaming within the interior of said container;
   said contacting said scrap with said hot gas transferring heat from said hot gas stream to said scrap lowering the temperature of said hot gas stream, while concurrently raising the temperature of said scrap
   (a) through a first temperature phase wherein low boiling hydrocarbons and water are volatilized and decomposed into gases which are diffused into said hot gas stream and (b) to a second temperature phase wherein high boiling contaminants are volatilized or decomposed and other contaminants which are essentially capable of being oxidized below 1200° F. but which are not volatilized, are oxidized and (c) maintaining said scrap within the second temperature phase for a time period sufficient to insure complete removal of said contaminants;
   discharging said decontaminated scrap from said container.
2. The process of claim 1 wherein:

said first temperature phase is from about 200° F. to about 750° F.

3. The process of claim 2 wherein:
said second temperature phase is from about 850° F. to about 1200° F.

4. The proces of claim 3 wherein:
said second temperature phase is from about 900° F. to about 1050° F.

5. The process of claim 4 wherein:
said hot gas stream is introduced into said inlet end of said closed container at a temperature of from about 1100° F. to about 2000° F.

6. The process of claim 5 wherein:
said hot gas stream is introduced into said inlet end of said closed container at a temperature of from about 1250° F. to about 1600° F.

7. The process of claim 6 wherein:
the temperature at which said scrap is maintained within said second temperature range is from about 900° F. to about 1050° F.

8. The process of claim 7 wherein:
said conditions essentially incapable of sustaining combustion include control of the temperature of said hot gas stream and control of the concentration of said gasified hydrocarbons in said hot gas stream.

9. The process of claim 8 wherein:
said conditions essentially incapable of sustaining combustion include control of the temperature of said hot gas stream, control of the oxygen content of said hot gas stream, and control of the concentration of said gasified hydrocarbons in said hot gas stream.

10. The process of claim 9 wherein:
the velocity of said hot gas stream passing from said inlet end to said exit end of said container is sufficient to suspend and maintain suspended within the hot gas stream a substantial portion of the unwanted fines and dust components of said contaminants.

11. The process of claim 8 wherein:
said velocity is from about 7 to about 12 ft/sec.

12. The process of claim 8 wherein:
said scrap is maintained in said container for a total residence time of from about three minutes to about 20 minutes.

13. The process of claim 12 wherein:
said scrap is maintained in said container for a total residence time of from about 5 minutes to about 15 minutes.

14. The process of claim 13 wherein:
said time period to insure essentially complete oxidation is from about 2 minutes to about 18 minutes.

15. The process of claim 9 wherein:
said oxygen content is less than about 8% and greater than about 2%.

16. The process of claim 9 wherein:
said temperature of said hot gas stream is equal to or greater than 1500° F. and said oxygen content of said gas stream is less than 6% and greater than 2%.

17. The process of claim 9 wherein:
said temperature of said hot gas stream is less than 1500° F. and said oxygen content of said gas stream is less than 8% and greater than 2%.

18. The process of claim 8 wherein:
flammable gases produced by volatilization are disbursed into said hot gas stream such that for each pound of said hot gas the concentration of said flammable gases is below a concentration which will supply 180 Btu's of heat value from said flammable gas per pound of hot gas.

* * * * *